(No Model.)
W. H. DOANE.
Sectional-Shaft for Wood-Working Machine.
No. 228,046. Patented May 25, 1880.
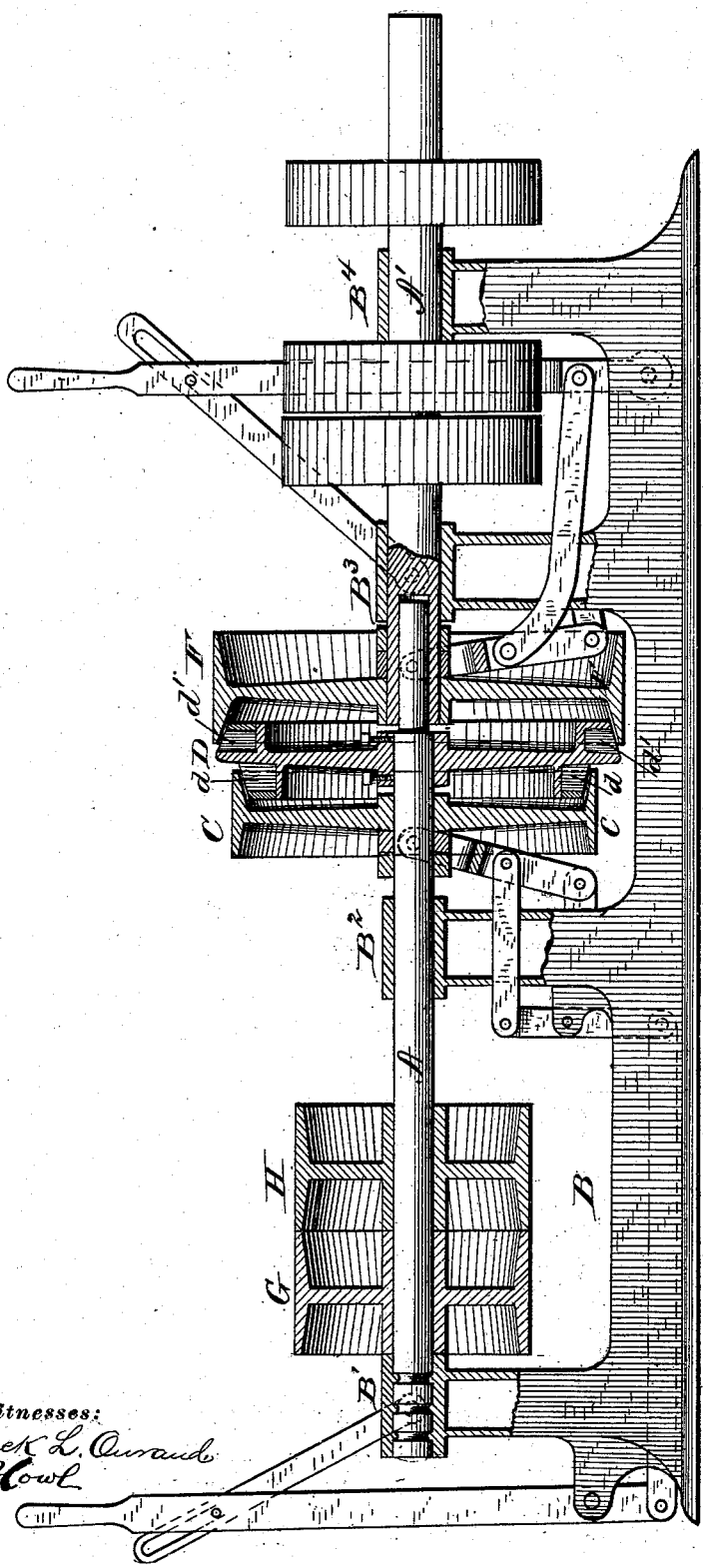
Witnesses:
Franck L. Ourand
D. P. Cowl
Inventor:
William H. Doane
by his attorney

United States Patent Office.

WILLIAM H. DOANE, OF CINCINNATI, OHIO.

SECTIONAL SHAFT FOR WOOD-WORKING MACHINES.

SPECIFICATION forming part of Letters Patent No. 228,046, dated May 25, 1880.

Application filed March 13, 1880. (No model.)

*To all whom it may concern:*

Be it known that I, WILLIAM H. DOANE, a citizen of the United States, residing at Cincinnati, in the county of Hamilton and State of Ohio, have invented certain new and useful Improvements in Sectional Shafts for Wood-Working Machines; and I do hereby declare the following to be a full, clear, and exact description of the invention, such as will enable others skilled in the art to which it appertains to make and use the same, reference being had to the accompanying drawing, and to letters or figures of reference marked thereon, which form part of this specification.

This invention was contrived with a view of overcoming some practical objections inherent in the construction and arrangement of the counter-shaft, friction-driver, and pulleys described and claimed in United States Letters Patent No. 210,761. In the practical operation of these patented devices it was found that the long heavy driving-sleeve forming part thereof had a cutting tendency, which could not be guarded against, but was rather aggravated by lubrication. Moreover, the arrangement precluded the use of bearings near the friction-driver.

My improvement consists, mainly, in dividing the counter-shaft into two parts, one part of which carries the duplex friction-driver, and, projecting beyond said driver, enters a socket or sleeve on the adjacent end of the other part or section of the shaft, and is supported thereby, the driving-sleeve of said patent being omitted, and the friction-driver mounted directly on one section of the divided shaft to drive a friction-pulley on the same section of shaft, or a friction-pulley on the other section of shaft, or both simultaneously, at the will of the operator.

The annexed drawing is a sectional side elevation of my improved counter-shaft and its adjuncts.

The counter-shaft is composed of the two parts or sections A and A', arranged in the same axial line. The outer end of section A turns in the bearing B' of the stand B, and to prevent endwise movement may be grooved to engage ribs in the bearings, as shown. The section A passes through the bearing $B^2$ and is supported thereby. The pulley C turns loosely on the section A of the shaft.

Beyond the pulley C section A has secured to it the duplex friction-driver D, the friction-rim $d$ of which is adapted to engage the rim of pulley C and drive it, whenever the latter is forced upon it, by the system of levers and links shown.

The section A' of the counter-shaft is supported directly in the bearing $B^4$ of the stand, and by its socketed or tubular end in the bearing $B^3$. To the projecting tubular end of section A' the pulley F is rigidly secured.

Section A' of the counter-shaft is susceptible of a little endwise movement in order that pulley F may be forced on and off the friction-rim $d'$ of the duplex friction-driver, which can be effected by the system of levers and links shown.

Section A of the counter-shaft extends beyond the duplex friction-driver, and reaches so far into the tubular end of section A' as to find a support in the bearings $B^3$ through the intervention of said tubular end. Section A carries a fast pulley, G, for driving it by a belt from a pulley on the line-shaft, and a loose pulley, H, onto which the driving-belt may be shifted when the counter-shaft is to stand still.

It will be understood that the construction and arrangement of parts described provide for driving the pulleys C and F either separately or simultaneously. Also, that both may be stopped while the duplex friction-driver continues running, all of which is desirable in the use of this invention in connection with the universal wood-working machine described in the aforementioned patent, for which machine the invention was specially designed.

It is deemed unnecessary to describe in detail the means for shifting pulleys C and F or the purposes of the pulleys shown but not specially referred to, as these features have no special bearing on the invention here claimed.

For purposes of distinction section A may be called the "driving-shaft" and section A' the "driven shaft."

What I claim as my invention, and desire to secure by Letters Patent, is—

5   The combination, substantially as before set forth, of the rotary driving-shaft, the fast duplex friction-driver, and shiftable loose friction-pulley thereon, the endwise shiftable and socketed or tubular-ended driven shaft, and the fast driven pulley on said shaft.

WM. H. DOANE.

Witnesses:
ALBERT A. NEAVE,
JOS. C. NOYES.